No. 640,438. Patented Jan. 2, 1900.
E. A. BLANTON, Jr.
NUT LOCK.
(Application filed Sept. 24, 1898.)
(No Model.) 2 Sheets—Sheet 1.

Witnesses
Inventor
Edward A. Blanton Jr.
By Foster Freeman
Attorneys

No. 640,438. Patented Jan. 2, 1900.
E. A. BLANTON, Jr.
NUT LOCK.
(Application filed Sept. 24, 1898.)
(No Model.) 2 Sheets—Sheet 2.
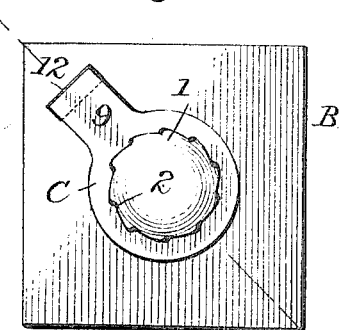
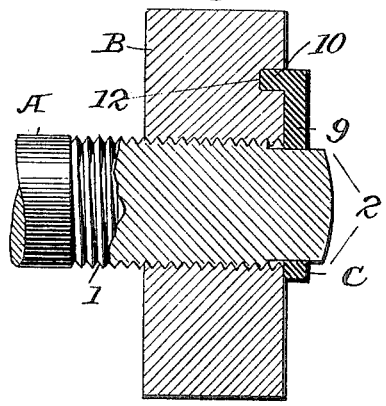
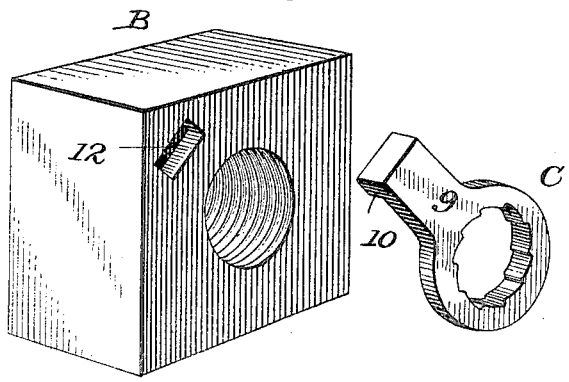

UNITED STATES PATENT OFFICE.

EDWARD A. BLANTON, JR., OF RIDLEY PARK, PENNSYLVANIA.

NUT-LOCK.

SPECIFICATION forming part of Letters Patent No. 640,438, dated January 2, 1900.

Application filed September 24, 1898. Serial No. 691,790. (No model.)

*To all whom it may concern:*

Be it known that I, EDWARD A. BLANTON, Jr., a citizen of the United States, residing at Ridley Park, in the county of Delaware and State of Pennsylvania, have invented certain new and useful Improvements in Nut-Locks, of which the following is a specification.

This invention relates to certain new and useful improvements in nut-locks, having for its object to provide simple and effective means which may be cheaply and expeditiously manufactured, whereby bolts and their nuts may be securely held against relative movement when adjusted to secure two or more parts together.

With this object in view the invention consists in the novel construction and combination of the parts hereinafter fully set forth.

Figure 1:
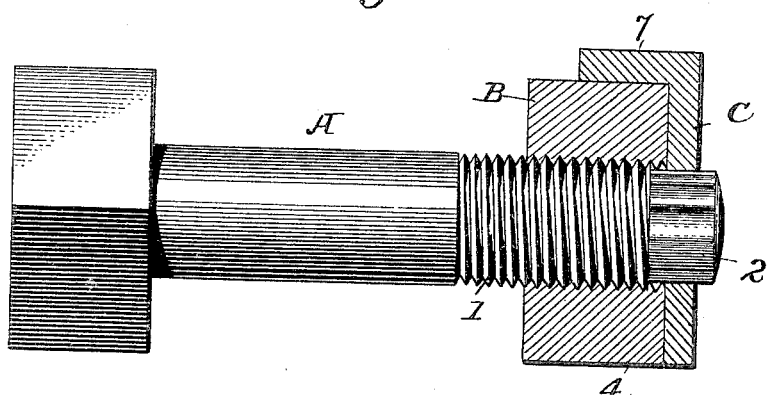
Figure 2:
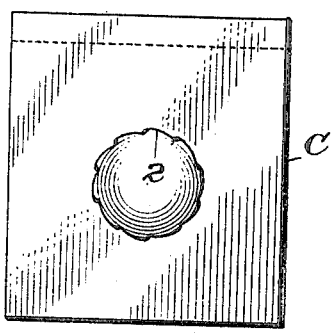
Figure 3:
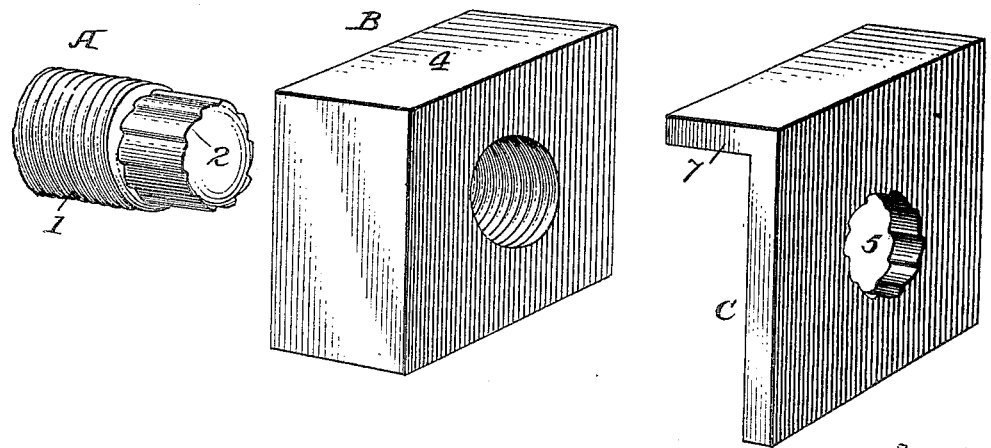

In the accompanying drawings, forming a part of this specification, and in which like letters and numerals of reference designate corresponding parts, Figure 1 is a side elevation of a bolt with a nut and a locking device applied thereto and shown in section. Fig. 2 is an end view. Fig. 3 is a perspective view of the parts disconnected, part of the bolt being broken away. Fig. 4 is an end view of a modified form of the invention. Fig. 5 is a sectional view thereof, and Fig. 6 is a perspective view of the nut and locking-piece.

Referring more particularly to the drawings, A designates a bolt, which may be of any usual construction and dimensions and having the usual threaded shank 1. At its end the shank is formed with one or more bosses or wedge-shaped portions 2, extending longitudinally along the shaft for a short distance. As shown, there is a series of these bosses arranged circumferentially around the end of the bolt-shank, the bosses being equidistantly spaced or symmetrically arranged. It will be understood, however, that the bosses may extend only partially around the end of the bolt, and they may vary in number to suit different conditions. The outer faces of the bosses are preferably on curves having gradually-increasing radii, measuring from the center of the bolt, and said outer faces are either in the form of true eccentrics or involute curves.

Adapted to be received upon the threaded portion of the bolt-shank is a nut B, which may be of ordinary construction, having the usual plurality of flat sides 4, which in one embodiment of the invention constitute bearing-surfaces for an engaging portion of the locking-piece C. This locking-piece consists of an angular or circular plate formed with an opening 5, adapted to receive the bossed end of the bolt A, and in the surrounding walls of said opening are formed one or more recesses, corresponding in number to the bosses on the bolt. The surfaces of these recesses are curved correspondingly to the surfaces of the bosses of the bolt, but said surfaces are inclined in opposite directions to said bosses and are slightly longer than those of the said bosses in order to leave a small space between the thickened portion of the bosses and the corresponding radial portions of the recesses. At its edge the locking-piece is formed with a lip or flange 7, extending at an angle to the face of the locking-piece, and which is adapted to engage with a bearing-surface of the nut when the parts are in their proper relative positions.

As shown in Figs. 1 to 3, the locking-piece comprises a flat angular plate, from one edge of which extends a flange having a flat face, the said flange being coextensive with any one of the flat sides 4 of the nut and being adapted to overhang and closely conform to one of said sides when the locking-piece is fitted upon the end of the bolt.

In Figs. 4 to 6 a somewhat different embodiment of the invention is illustrated. In the construction shown in these figures the locking-piece C is substantially ring-shaped and formed at its edge with an extension-piece 9, having an angular projection 10, which is adapted to be received into a recess 12, formed in the outer face of the nut, the walls of the said recess constituting the bearing-surfaces 4.

With the parts thus constructed and arranged, when the bolt A has been passed through two or more parts to be connected the nut B is screwed upon the exposed threaded portion of the bolt-shank and tightened against the surface of one of the connected parts. The locking-piece C is then slipped longitudinally upon the bossed end of the bolt-shank, and its engaging portion is brought into contact with the bearing-surface 4 of the nut, the frictional contact of said locking-piece and the nut and bolt serving to maintain it from slipping off the end of the bolt. If now any accidental turning of the bolt should take place, the locking-piece will be likewise turned by reason of the engagement of its engaging portion with the bearing-surface of the nut, causing the curved eccentric surfaces of the recesses thereof to ride upon the corresponding surfaces of the bosses 2, thereby wedging the bolt A and locking-piece together and, through the medium of the engaging piece, holding the nut B against further turning. It will be manifest that when it is desired to remove the nut from the bolt this may be readily accomplished by turning the locking-piece C or nut B in the proper direction to loosen the engagement between the eccentric surfaces of the bosses 2 and the recesses, when the locking-piece may be slipped longitudinally upon and removed from the end of the bolt.

From the above description it will be readily apparent that a simple and exceedingly effective nut-lock is produced and one which may be cheaply manufactured. It is not deemed necessary, therefore, to further emphasize the principles or advantages of the invention, as it is thought that they will be readily understood and appreciated by those skilled in the art. It will, too, be obvious that the invention is susceptible of a great many different embodiments and that various changes in the construction and arrangement of the parts thereof may be made without departing from the spirit or scope of the invention, since

What I claim is—

1. In a nut-lock, the combination with a bolt having a threaded shank and formed with a series of eccentric bosses having curved surfaces of gradually-increasing radii, a nut provided with a bearing-surface adapted to screw upon the bolt, and a locking device formed with a series of depressions having curved surfaces adapted to engage and conform to the surfaces of the bosses of the bolt and to permit a limited amount of movement between the engaging surfaces of the bolt and locking device in one direction, and also having an engaging portion adapted to the bearing-surface of the nut, substantially as described.

2. In a nut-lock, the combination with a bolt having a threaded shank formed at its periphery with a series of longitudinally-extending eccentric bosses having curved surfaces of gradually-increasing radii, a nut provided with a flat bearing-surface, adapted to be received upon the threaded portion of the bolt, and a locking device having an opening for the reception of the shank of the bolt, the wall of said opening being formed with a series of inclined curved surfaces adapted to conform to and ride upon the eccentric surfaces of the bosses and to permit a limited movement between said surfaces when the parts are moved in one direction, the said locking device being also provided with an engaging portion extending at an angle thereto and adapted to overlie and contact with the bearing-surface of the nut, substantially as described.

In testimony whereof I have signed my name to this specification in the presence of two subscribing witnesses.

EDWARD A. BLANTON, JR.

Witnesses:
A. L. BOLKENKAMP,
E. S. H. BLANTON.